United States Patent [19]

Yannopoulos et al.

[11] 3,788,725

[45] Jan. 29, 1974

[54] METHOD OF DOSING AN INCANDESCENT LAMP WITH A CONTROLLED AMOUNT OF HALOGEN-CONTAINING MATERIAL

[75] Inventors: Lymperios N. Yannopoulos; Alfred R. Pebler, both of Pittsburgh, Pa.

[73] Assignee: Westinghouse Electric Corporation, Pittsburgh, Pa.

[22] Filed: June 14, 1972

[21] Appl. No.: 262,872

Related U.S. Application Data

[62] Division of Ser. No. 158,435, June 30, 1971, Pat. No. 3,707,643.

[52] U.S. Cl. .................................... 316/20, 316/30
[51] Int. Cl. ............................................... H01j 9/38
[58] Field of Search ......... 316/1, 11, 17, 18, 20, 24, 316/27, 30, 31, 21; 250/43.5; 313/222, 226; 23/254

[56] References Cited
UNITED STATES PATENTS 3,328,108   6/1967   Keenan et al. ..................... 316/30
3,484,146   12/1969  Meijer et al. ....................... 316/20

FOREIGN PATENTS OR APPLICATIONS 961,245   6/1964   Great Britain ....................... 316/11

OTHER PUBLICATIONS

H. R. Hindley, "The Infra-Red Gas Analyser," 6–1947, Manufacturing Chemist and Manufacturing Perfumer, pp. 246–248.

Primary Examiner—Charles W. Lanham
Assistant Examiner—J. W. Davie
Attorney, Agent, or Firm—A. T. Stratton et al.

[57]   ABSTRACT

A halogen-containing material such as carbon tetrabromide is vaporized and admixed with an inert fill gas, the lamp is evacuated, and the admixed fill gas and vaporized material are introduced into the lamp. The amount of vaporized halogen-containing material in the mixture is monitored by infrared measuring techniques so that a known and carefully controlled quantity of such material is sealed within the finished lamp.

5 Claims, 2 Drawing Figures

PATENTED JAN 29 1974 3,788,725

METHOD OF DOSING AN INCANDESCENT LAMP WITH A CONTROLLED AMOUNT OF HALOGEN-CONTAINING MATERIAL

CROSS-REFERENCE TO RELATED APPLICATION

This application is a division of application Ser. No. 158,435 filed June 30, 1971 (now U.S. Pat. No. 3,707,643).

FIELD OF THE INVENTION

This invention relates to a regenerative-cycle type of electric lamp that contains a tungsten filament and a halogen atmosphere and in re particularly, to an improved method for filling such lamps with a controlled amount of a halogen-containing material.

DESCRIPTION OF THE PRIOR ART

Halogen incandescent lamps are well known in the art and a lamp of this type in which the regenerative cycle is sustained by an inert fill gas that contains a small quantity of iodine is described in U.S. Pat. No. 2,883,571 to E. G. Fridrich et al. Lamps of this type in which bromine is used as the halogen in combination with hydrogen are also well known in the art and are disclosed in U.S. Pat. No. 3,538,373 issued to P. C. van der Linden et al. The concept of dosing such lamps with small amounts of both bromine and iodine, either alone or in combination with hydrogen, is disclosed in U. S. Pat. No. 3,453,476 and the use of carbon tetrabromide per se in dosing lamps of this type is disclosed in U.S. Pat. Nos. 3,431,448 and 3,510,189.

Despite the many recent improvements made in halogen incandescent lamps experience has shown that when bromine is employed as the halogen additive premature blackening of the lamp envelope and a corresponding reduction in the useful life of the lamp sometimes occurs. This is particularly true of lamps that have been dosed with methylene bromide ($CH_2Br_2$) and thus have an atmosphere that contains both hydrogen and bromine. In addition, $CH_2Br_2$ is toxic and requires safeguards which complicates the manufacture of such lamps under factory conditions.

SUMMARY OF THE INVENTION

The foregoing quality and manufacturing problems are solved in accordance with the present invention by dosing such regenerative-type lamps with carefully controlled amounts of carbon tetrabromide ($CBr_4$) to provide small but critical quantities of bromine within the operating lamps, and by excluding both hydrogen and oxygen from the lamp atmosphere. Lamps made in accordance with the invention burn beyond their design life of 2,000 hours without exhibiting envelope-blackening or destructive etching of the tungsten filament or inner leads. The non-corrosive nature and relative nontoxicity of $CBr_4$ greatly facilitates lamp manufacture under factory conditions and permits the halogen additive to be admixed with the inert fill gas without contaminating the lamp with hydrogen or oxygen.

The amount of bromine and carbon introduced into the lamp is carefully controlled by measuring the quantity of $CBr_4$ vapor present in the inert fill gas prior to its introduction into the lamp. This is achieved by making the gas-sampling component of an infrared analyzing instrument an integral part of the gas-filling system and comparing the amount of infrared energy absorbed by the halogen-dosed fill gas with that absorbed by a gas of known composition in the reference cell component of the analyzer. The invention thus provides a unique and practical method of dosing a regenerative-cycle type incandescent lamp with a precisely controlled amount of $CBr_4$ which dissociates within the operating lamp to provide a small but critical amount of elemental bromine which insures that that the lamp will operate without premature blackening.

Both hydrogen and oxygen are excluded from the lamp atmosphere by subjecting the lamp to a series of flushing cycles and a filament-flashing operation prior to filling it with the $CBr_4$-dosed inert gas.

BRIEF DESCRIPTION OF THE DRAWING

A better understanding of the invention will be obtained from the exemplary embodiment of the invention shown in the accompanying drawing, wherein.

DESCRIPTION OF THE PREFERRED EMBODIMENT

Figure 1:
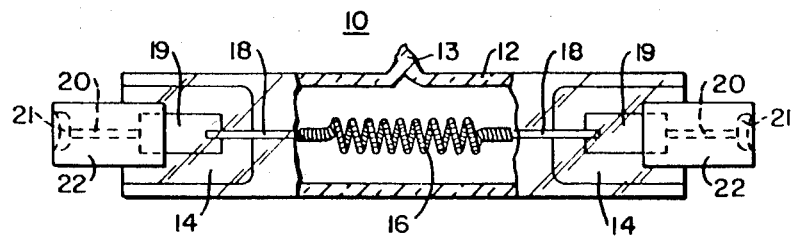
FIG. 1 is an enlarged side elevational view of a representative halogen regenerative-cycle incandescent lamp.

In FIG. 1 there is shown a 400 watt T4 halogen incandescent lamp 10 which is representative of the type of lamp to which the present invention is addressed. The lamp 10 is designed to operate on a 120 volt power source for 2,000 hours. It has a tubular envelope 12 of suitable light-transmitting material, such as quartz, that has a high melting point and can thus withstand the elevated operating temperatures involved without becoming deformed.

The envelope 12 is hermetically sealed by a protruding tipped-off segment 13 of an exhaust tubulation and by press seals 14 formed at each of its ends. A coiled-coil tungsten filament 16 is longitudinally suspended within the envelope 12 and is held in such position by a pair of tungsten inner leads 18 that are secured to the ends of the filament coil 16 and have their opposite ends embedded in the respective press seals 14. The embedded ends of the tungsten leads 18 are electrically connected to strips 19 of molybdenum foil that are also embedded in the respective seals 14 and, in turn, are fastened to outer leads 20 of molybdenum that are terminated by metal contactor buttons 21 which serve as the lamp terminals. The protruding ends of the lead-in conductor and terminal assemblies are protectively enclosed in ceramic sleeves 22 that are secured in the respective press seals 14 within a suitable cement in accordance with standard lamp-making practice.

The physical size of the coiled-coil filament 16 relative to that of the tubular envelope 12 is such that the bulb wall operates at a temperature of at least 250°, and preferably at 500° to 700° C, when the lamp 10 is operated at its rated voltage and wattage.

In accordance with the present invention the envelope 12 is dosed with a small but critical amount of carbon tetrabromide ($CBr_4$) that is in a gaseous or vaporous state and admixed with a suitable inert fill gas such as nitrogen, argon, krypton or xenon and mixtures thereof. The amount of $CBr_4$ introduced into the lamp 10 is carefully controlled so that from about 0.015 to 0.075 micromole of bromine per cc. of envelope volume is provided when the lamp 10 is energized and the $CBr_4$ is thermally decomposed.

The total pressure of the admixed $CBr_4$ and inert fill gas is not critical and can be in the range of from about 500 to 2,000 torr (at room temperature). However, the fill pressure is preferably within a range of from about 600 to 1,000 torr. Excellent results in the case of 400 watt T4 quartz lamps of the type shown in FIG. 1 have been obtained by filling the lamps with approximately 700 torr (total pressure) of a gas consisting of a mixture of 90 percent argon-10 percent nitrogen that contained from about 0.02 percent to 0.09 percent $CBr_4$.

An important feature of the invention is the purging of both oxygen and hydrogen from the lamp envelope 12 and filament 16 during lamp manufacture, and the exclusion of both of these elements from the $CBr_4$ dosed fill gas introduced into the lamp 10. By carefully controlling the purity of the halogen additive and fill gas constituents and purging the lamp 10 of impurities prior to the gas-filling operation (as described below), the hydrogen and oxygen partial pressure have each been maintained below $10^{-2}$ torr. the atmosphere of the finished lamp 10 is, accordingly, substantially devoid of both oxygen and hydrogen.

LAMP DOSING SYSTEM

Figure 2:
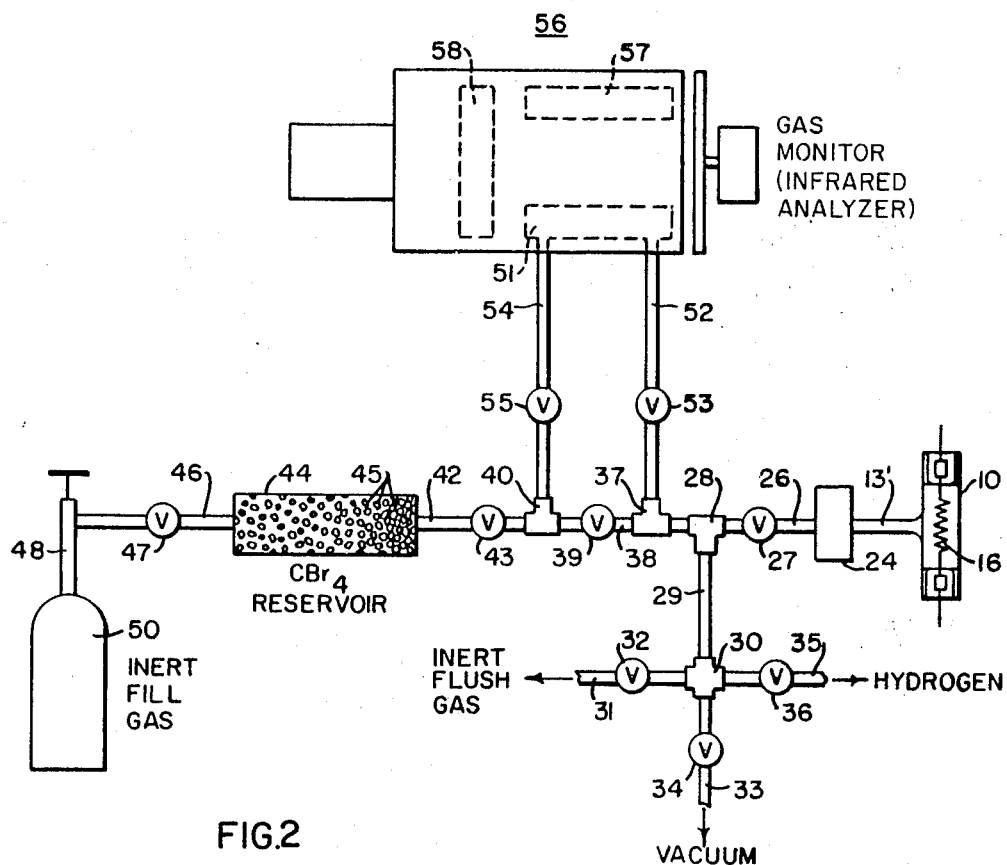
FIG. 2 is a schematic of a system for dosing an inert fill gas with measured amounts of a halogen-containing material, purging the lamp of impurities and evacuating it, and then introducing the dosed fill gas into such a lamp in accordance wih the invention.

In FIG. 2 there is shown a schematic representation of a preferred apparatus for dosing regenerative-cycle type lamps with carefully controlled amounts of a halogen additive, such as $CBr_4$, in accordance with the present invention.

As shown, the partly fabricated lamp 10 containing the coiled filament 16 is connected (by means of its depending quartz exhaust tubulation 13') to a compression type head or coupling member 24 that is joined by a manifold 26 and valve 27 to a T-connector 28. One arm of the connector 28 is joined by a conduit 29 to a 4-way connector 30 that can be coupled to an inert flush gas supply, a vacuum system, or a hydrogen supply by conduit-valve combinations 31–32, 33–34 and 35–36, respectively.

The other side of T-connector 28 is joined by a conduit to another T-connector 37 which, in turn, is joined by a conduit-valve combination 38–39 to a third T-type connector 40. The opposite arm of T-connector 40 is joined by a conduit-valve combination 42–43 to a temperature-controlled chamber 44 that contains a reservoir of $CBr_4$ in solid form and is filled with suitable means, such as loosely packed glass granules 45, that provide a tortuous flow path through the chamber. Another conduit-valve combination 46–47 connects the other end of the chamber 44 to a conduit 48 and a tank 50 of compressed inert fill gas, such as a mixture of 90 percent argon and 10 percent nitrogen.

The remaining arms of T-connectors 37 and 40 are connected to an elongated chamber 51 by a pair of interconnecting conduit-valve combination 52–53 and 54—55, respectively. The chamber 51 comprises the sample cell of an infrared analyzing device 56 which permits the $CBr_4$ content of the fill gas to be measured just before the latter is introduced into the lamp 10. The end walls of the chamber 51 are thus made of infrared-radiation transmitting material and, in conjunction with a similar but independent reference cell 57 and a detector 58, provides an "on-line" system for monitoring and controlling the composition of the dosed fill gas.

Infrared analyzing instruments for accurately measuring the concentration of a chemical compound (such as $CBr_4$) in a gas are well known and utilize infrared sources of energy, an optical chopper, sample and reference cells, a detector and a signal recorder to measure the amount of infrared energy absorbed by the gas mixture in the sample cell and compare it to the energy absorbed by a known gas in the reference cell. Infrared analyzers of this type are described in detail in Bulletin 4055–D entitled "BECKMAN INFRARED ANAYLZERS" available from Beckman Instruments Inc., Process Instruments Division, Fullerton, California 92634. However, such instruments have not been used in manufacturing halogen type lamps.

LAMP PURGING AND GAS-FILLING METHOD

The sequence of steps in purging the lamp 10 of impurities and filling it with a carefully controlled amount of $CBr_4$-dosed fill gas using the system illustrated in FIG. 2 will now be described.

Before the lamp 10 is inserted into the coupling member 24, the system is primed by properly adjusting the temperature of the $CBr_4$ reservoir and the velocity of the fill gas as it flows through chamber 44 from tank 50 so that $CBr_4$ vapor is entrained in the stream of fill gas at a predetermined rate. This is achieved by closing valves 32, 34, 36 and 39, and opening valves 27, 53, 55, 43 and 47 so that fill gas flows from tank 50 through the $CBr_4$ reservoir 44 and sample cell 51 of the infrared analyzer 56 and out through the opening coupling member 24. When the proper amount of $CBr_4$ vapor is entrained in the fill gas (as indicated by the reading obtained on infrared analyzer 56), valves 27 and 53 are closed and the system is ready for use. Valve 55 is also closed and a predetermined volume of dosed fill gas is thus trapped at a known pressure in the enclosure defined by the sample cell 51 and associated segments of conduits 52, 54.

The exhaust tubulation 13' of the lamp 10 is then inserted into the coupling member 24 and the latter is compressively locked to provide a seal. Valves 27 and 32 are then opened and the lamp 10 is thus connected to the inert flush gas supply, preferably the argon-nitrogen mixture with which the lamp will ultimately be filled. After the lamp 10 has been filled with flush gas to a suitable pressure (1 atmosphere for example), valve 32 is closed and valve 34 is opened, thus connecting the lamp 10 to the vacuum system. The lamp is then exhausted to a suitable pressure, such as 1 micron of mercury for example. This completes one flush cycle.

The aforesaid sequence of operations is repeated until at least four flush cycles have been completed and the lamp 10 and its connecting manifold 26 have been thoroughly purged of hydrogen and oxygen and other gaseous impurities.

Prior to the gas-filling operation, and preferably between the second and third flush cycles, the lamp filament 16 is also purged of impurities by opening valve 36 and connecting the evacuated lamp 10 to the hydrogen supply (valve 32 an 34 being closed) so that the lamp is filled with about one atmosphere of hydrogen. The filament 16 is then flashed by momentarily energizing it, and the lamp 10 is evacuated by closing valve 36 and opening valve 34 in the vacuum line 33. Valve 34 is kept open until the lamp is evacuated to a pressure of about 1 micron of mercury. The flushing operation is then resumed.

After the last flush cycle has been completed and the lamp 10 has been evacuated to about 1 micron pressure, valve 34 is closed and valve 53 is opened - thus permitting the $CBr_4$-dosed fill gas in cell 51 and lines 52, 54 to expand into the lamp envelope through the exhaust tubulation 13' and interconnecting portion of the system. The aforesaid interconnecting portion of the system consists of the portions of conduits which extend from coupling member 24 through connector 28 and 37 to valve 39, from connector 37 to valve 53, and from connector 28 to valves 32, 34 and 36 through conduit 29, the 4-way connector 30 and the interposed segments of conduits 31, 33 and 35. The volume of this interconnecting portion of the system is known and calibrated. Thus, the concentration or amount of $CBr_4$ introduced into the lamp 10 can readily and accurately be controlled by correlating the dosage contained in the expanded volume of admixed $CBr_4$ and fill gas with the measurement data obtained from the gas monitor 56.

After the lamp 10 has been charged with $CBr_4$-dosed fill gas to the proper pressure, valve 27 is closed and exhaust tubulation 13' is heated and tipped—off—thus separating the lamp 10 from the system and completing the gas-filling operation. Valve 53 is then closed, the remnant of the tubulation 13' in coupling member 24 is removed, a new lamp 10 is connected to the system, and the above sequence of operations is repeated.

As will be apparent to those skilled in the art, the above-described system can be used to process and fill any desired number of lamps by providing multiple coupling members and appropriately adjusting the pressure of the $CBr_4$-dosed fill gas in the calibrated volume defined by the enclosure (that is, chamber 51, etc.).

We claim as our invention:

1. In the manufacture of a halogen regenerative-cycle type electric incandescent lamp having a light-transmitting envelope that contains a tungsten filament and has a depending tubulation, the method of dosing said lamp with a controlled amount of a halogen-containing material and concurrently filling it with an inert gas, which method comprises:

vaporizing said halogen-containing material and introducing the vapor into a stream of inert gas at a predetermined rate, conveying the resulting stream of admixed inert gas and vapor to an enclosure of predetermined volume and confining the vapor-gas mixture therein, controlling the amount of vaporized halogen-containing material in the confined mixture by (a) passing infrared radiation through said confined mixture and comparing the amount of infrared energy that is absorbed with the amount of such energy which is absorbed by a gaseous atmosphere of known composition and thereby measuring the amount of vapor in said confined mixture, and (b) maintaining the flow of said admixed inert gas and entrained vapor into said enclosure until the measured amount of said vapor reaches a predetermined value, evacuating the envelope through said tubulation, connecting the tubulation of said evacuated lamp envelope to said enclosure so that the confined gas-vapor mixture therein expands into and fills said envelope and the latter is thereby dosed with a controlled amount of vaporized halogen-containing material, and then hermetically sealing off said tubulation and separating the dosed and gas-filled lamp envelope from said enclosure.

2. The lamp dosing-and-filling method of claim 1 wherein:

said halogen-containing material comprises $CBr_4$, and the gas-vapor mixture is formed by passing the stream of said inert gas through a temperature-controlled reservoir which contains solid $CBr_4$.

3. The lamp dosing-and-filling method of claim 2 wherein said envelope is initially purged of hydrogen, oxygen and gaseous impurities by a series of flush cycles each of which consists of filling the envelope within an inert gas and then evacuating the gas through the envelope tubulation.

4. The lamp dosing-and-filling method of claim 3 wherein:

the lamp envelope is subjected to four flush cycles, and prior to the third flush cycle the lamp filament is purged of impurities by filling the envelope with hydrogen, flashing the filament and then evacuating the envelope through said tubulation.

5. The lamp dosing-and-filling method of claim 3 wherein said envelope is filled with about one atmosphere of inert gas and then exhausted to a pressure 9f about 1 micron of mercury during each of said flush cycles, and the inert gas and $CBr_4$ mixture in said enclosure is at a pressure such that the fill pressure of said mixture in the sealed-off envelope is approximately 700 torr.

* * * * *